(12) United States Patent
Inoue et al.

(10) Patent No.: US 11,813,891 B2
(45) Date of Patent: Nov. 14, 2023

(54) HUB FOR HUMAN-POWERED VEHICLE

(71) Applicant: Shimano Inc., Osaka (JP)

(72) Inventors: Kenkichi Inoue, Osaka (JP); Yuuya Yoneda, Osaka (JP)

(73) Assignee: Shimano Inc., Osaka (JP)

( * ) Notice: Subject to any disclaimer, the term of this patent is extended or adjusted under 35 U.S.C. 154(b) by 247 days.

(21) Appl. No.: 17/336,749

(22) Filed: Jun. 2, 2021

(65) Prior Publication Data

US 2022/0388332 A1    Dec. 8, 2022

(51) Int. Cl.

| | |
|---|---|
| *B60B 27/00* | (2006.01) |
| *B60B 27/02* | (2006.01) |
| *B62J 11/19* | (2020.01) |
| *B62M 6/40* | (2010.01) |
| *B62J 45/00* | (2020.01) |

(52) U.S. Cl.
CPC ........ *B60B 27/0047* (2013.01); *B60B 27/023* (2013.01); *B62J 11/19* (2020.02); *B62M 6/40* (2013.01); *B62J 45/00* (2020.02)

(58) Field of Classification Search
CPC .............. B60B 27/0047; B60B 27/023; B60B 27/0068; B62M 6/40; B62M 6/45; B62M 6/50; B62M 6/55; B62M 6/60; B62M 6/65; B62M 6/70; B62M 6/75; B62M 6/80; B62M 6/85; B62M 6/90; B62J 6/12; B62J 45/00; B62J 11/19
See application file for complete search history.

(56) References Cited

U.S. PATENT DOCUMENTS

| | | | |
|---|---|---|---|
| 5,606,207 | A | 2/1997 | Gotoh |
| 6,924,569 | B2 | 8/2005 | Endo et al. |
| 2006/0202575 | A1 | 9/2006 | Itoi et al. |
| 2017/0259663 | A1 | 9/2017 | Chan |
| 2018/0170099 | A1 | 6/2018 | Yamazaki |
| 2018/0362108 | A1* | 12/2018 | Yamazaki .................. B62J 6/12 |

FOREIGN PATENT DOCUMENTS

| | | | | | |
|---|---|---|---|---|---|
| CN | 1590201 | A | * | 3/2005 | ............... B62J 6/12 |
| CN | 200960960 | Y | | 10/2007 | |
| CN | 102318143 | A | * | 1/2012 | .......... H01R 13/646 |
| CN | 202115672 | U | * | 1/2012 | |
| CN | 103379867 | A | | 10/2013 | |
| CN | 104755367 | A | | 7/2015 | |
| CN | 202115672 | U | | 7/2015 | |
| CN | 108202788 | A | | 6/2018 | |
| DE | 102015203677 | B3 | * | 9/2016 | |
| DE | 10 2017 128 040 | A1 | | 6/2018 | |
| DE | 10 2018 112 420 | A1 | | 12/2018 | |
| JP | 9-132186 | A | | 5/1997 | |
| JP | 2670204 | B2 | | 7/1997 | |
| JP | 10-1081 | A | | 1/1998 | |
| JP | 2005-22476 | A | | 1/2005 | |
| JP | 4229768 | B2 | | 12/2008 | |

(Continued)

*Primary Examiner* — Kip T Kotter
(74) *Attorney, Agent, or Firm* — Global IP Counselors, LLP

(57) ABSTRACT

A hub is provided for a human-powered vehicle. The hub basically includes a hub axle, a member, a cable and a sealing element. The member is provided to the hub axle. The cable extends through a passageway. The sealing element is configured to occupy a space between the passageway and the cable.

18 Claims, 13 Drawing Sheets

(56) References Cited

FOREIGN PATENT DOCUMENTS

| | | | |
|---|---|---|---|
| JP | 2013-233844 A | 11/2013 | |
| TW | I377146 B1 | 11/2012 | |
| WO | 2005/011092 A1 | 2/2005 | |
| WO | 2012/088141 A2 | 6/2012 | |
| WO | WO-2021096143 A1 * | 5/2021 | .............. B62M 6/65 |

* cited by examiner

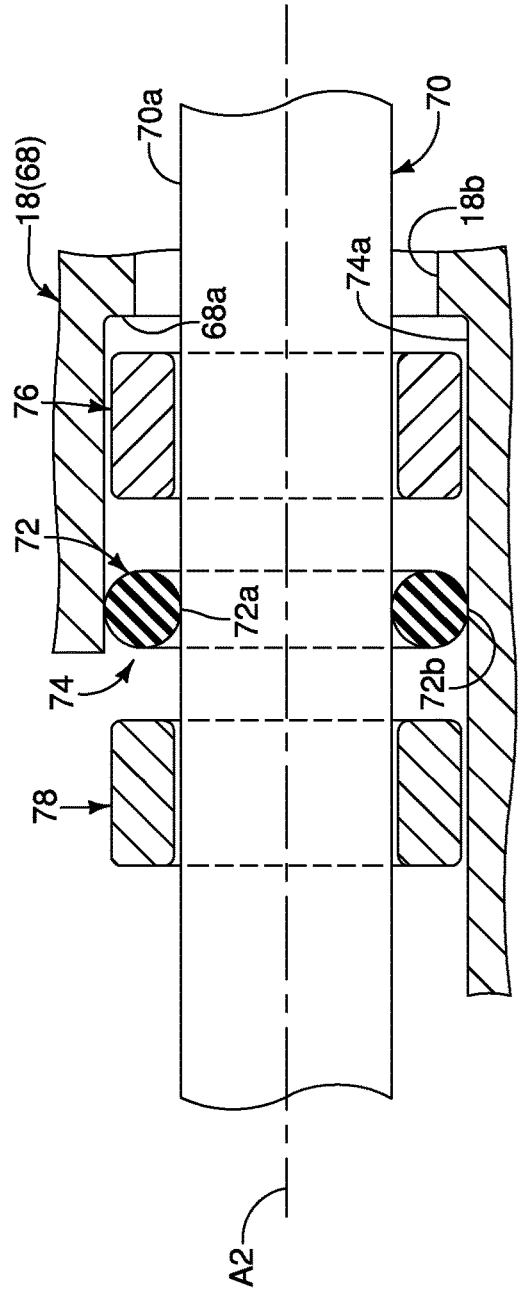
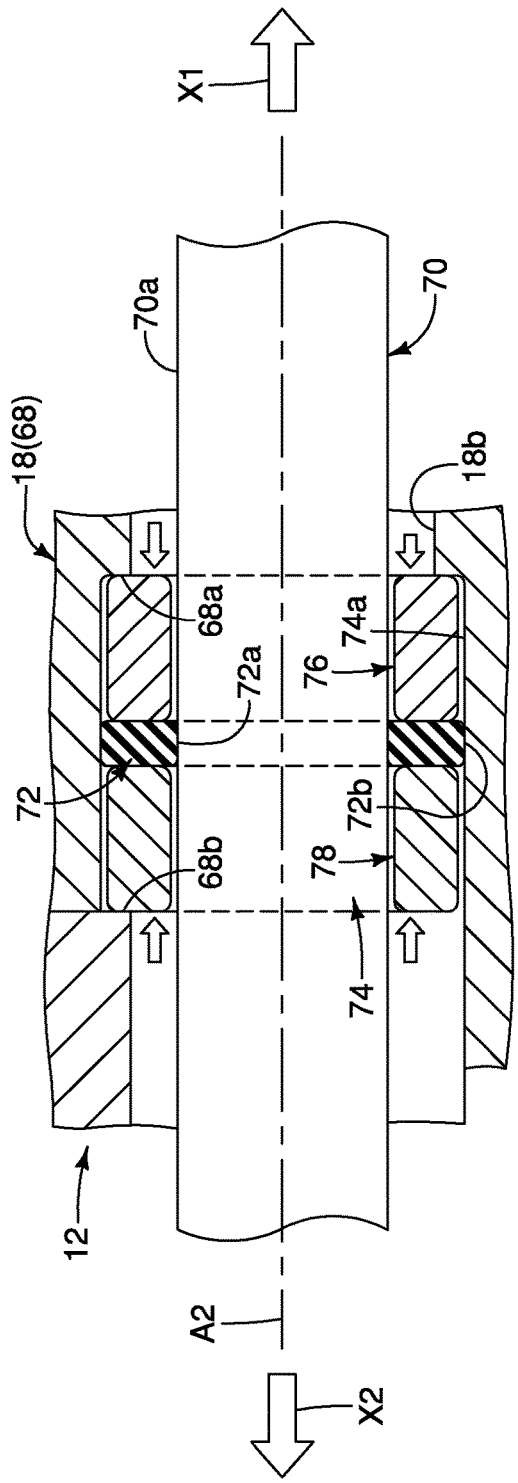
FIG. 11
FIG. 12

HUB FOR HUMAN-POWERED VEHICLE

TECHNICAL FIELD

This disclosure generally relates to a hub for a human-powered vehicle.

Background Information

Some wheels for human-powered vehicles (e.g., bicycle) have a hub, a plurality of spokes and an annular rim. The hub has a hub axle that is non-rotatably mounted to a frame of the human-powered vehicle. The hub has a hub body that is coaxially coupled to the hub axle so that the hub body is disposed radially outwardly with respect to the hub axle. The bearings are configured and arranged to support the hub body so that the hub body can freely rotate around the hub axle. In almost all types of bicycles except fixed gear and track racers, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

SUMMARY

Generally, the present disclosure is directed to various features of a hub for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub is provided for a human-powered vehicle. The hub basically comprises a hub axle, a member, a cable and a sealing element. The member is provided to the hub axle. The cable extends through a passageway. The sealing element is configured to occupy a space between the passageway and the cable.

With the hub according to the first aspect, it is possible to prevent containments from entering the hub via the passageway that the cable extends through.

In accordance with a second aspect of the present disclosure, the hub according to the first aspect is configured so that the sealing element has an inner peripheral surface contacting the cable and an outer peripheral surface contacting the passageway.

With the hub according to the second aspect, it is possible to ensure a reliable seal between the cable and the passageway.

In accordance with a third aspect of the present disclosure, the hub according to the second aspect is configured so that the inner peripheral surface of the sealing element is deformed by receiving force along a cable center axis of the cable, and the inner peripheral surface of the sealing element contacts with an exterior surface of the cable.

With the hub according to the third aspect, it is possible to easily install the sealing element on the cable while obtaining a reliable seal between cable and the sealing element.

In accordance with a fourth aspect of the present disclosure, the hub according to the second or third aspect is configured so that the outer peripheral surface of the sealing element is deformed by receiving force along a cable center axis of the cable, and the outer peripheral surface of the sealing element contacts with an inner surface of the passageway.

With the hub according to the fourth aspect, it is possible to easily install the cable and the sealing element within the passageway while obtaining a reliable seal between the outer peripheral surface of the sealing element contacts with the inner surface of the passageway.

In accordance with a fifth aspect of the present disclosure, the hub according to any one of the second aspect to the fourth aspect further comprises a first spacer and a second spacer. The first spacer is located on a first axial side of the sealing element with respect to a cable center axis of the cable. The second spacer is located on a second axial side of the sealing element with respect to the cable center axis, the second axial side is opposite from the first axial side with respect to the cable center axis, wherein the sealing element abuts against the first spacer and the second spacer.

With the hub according to the fifth aspect, it is possible to reliable deform the sealing element for sealing the space between the cable and the passageway.

In accordance with a sixth aspect of the present disclosure, the hub according to the fifth aspect is configured so that the member includes a first abutment limiting movement of the first spacer in a first axial direction, and the hub axle includes a second abutment limiting movement of the second spacer in a second axial direction that is opposite to the first axial direction with respect to the cable center axis.

With the hub according to the sixth aspect, it is possible to easily create the force for deforming the sealing element to seal the space between the cable and the passageway.

In accordance with a seventh aspect of the present disclosure, the hub according to the sixth aspect is configured so that the first spacer abuts against the member along the cable center axis, and the second spacer abuts against the hub axle along the cable center axis.

With the hub according to the seventh aspect, it is possible to further reliable seal the space between the cable and the passageway.

In accordance with an eighth aspect of the present disclosure, the hub according to any one of the first aspect to the seventh aspect is configured so that the member defines the passageway.

With the hub according to the eighth aspect, it is possible to easily create the passageway for the cable.

In accordance with a ninth aspect of the present disclosure, the hub according to the eighth aspect is configured so that the member includes an end cap that is provided on one end of the hub axle, and the end cap includes an opening as the passageway in which the cable extends through.

With the hub according to the ninth aspect, it is possible to avoid interference between the cable and other parts of the human-powered vehicle.

In accordance with a tenth aspect of the present disclosure, the hub according to any one of the first aspect to the seventh aspect is configured so that the hub axle defines the passageway.

With the hub according to the tenth aspect, it is possible to avoid interference between the cable and other parts of the human-powered vehicle.

In accordance with an eleventh aspect of the present disclosure, the hub according to the tenth aspect is configured so that the member includes a bearing spacer that is provided on the hub axle and supports a hub body via a bearing.

With the hub according to the eleventh aspect, it is possible to reliably support the hub body for rotation about the hub axle.

In accordance with a twelfth aspect of the present disclosure, the hub according to the tenth or eleventh aspect is configured so that the hub axle has a first axial end, a second axial end and an axial bore extending between the first axial end and the second axial end, and the passageway communicates with the axial bore at a location between the first axial end and the second axial end.

With the hub according to the twelfth aspect, it is possible to route the cable parallel to the rotational axis and avoid an abrupt bend of the cable.

In accordance with a thirteenth aspect of the present disclosure, the hub according to the twelfth aspect is configured so that the axial bore has a first bore section and a second bore section. The first bore section has a first inner diameter. The second bore section has a second inner diameter. The second inner diameter is smaller than the first inner diameter. The passageway connects with the first bore section.

With the hub according to the thirteenth aspect, it is possible to route the cable inside the hub axle to protect the cable.

In accordance with a fourteenth aspect of the present disclosure, the hub according to the twelfth or thirteenth aspect is configured so that the passageway extends non-perpendicularly to the axial bore.

With the hub according to the fourteenth aspect, it is possible to avoid an abrupt bend of the cable.

In accordance with a fifteenth aspect of the present disclosure, the hub according to any one of the first aspect to the fourteenth aspect is configured so that the sealing element is an elastic ring.

With the hub according to the fifteenth aspect, it is possible to easily install the sealing element.

In accordance with a sixteenth aspect of the present disclosure, the hub according to any one of the first aspect to the fifteenth aspect further comprises an electrical component, and the cable being an electrical cable that is electrically coupled to the electrical component.

With the hub according to the sixteenth aspect, it is possible to convey electricity to and/or from the hub.

In accordance with a seventeenth aspect of the present disclosure, the hub according to any one of the first aspect to the sixteenth aspect further comprises an electric power generator, and the cable being an electrical cable that is electrically coupled to the electric power generator.

With the hub according to the seventeenth aspect, it is possible to generate electric power from rotation of the hub.

Also, other objects, features, aspects and advantages of the disclosed hub will become apparent to those skilled in the art from the following detailed description, which, taken in conjunction with the annexed drawings, discloses preferred embodiments of the hub.

BRIEF DESCRIPTION OF THE DRAWINGS

Referring now to the attached drawings which form a part of this original disclosure:

FIG. 11 is an enlarged longitudinal cross-sectional view of a portion of a cable having a sealing element and a pair of spacers prior to installation of the cable;

FIG. 12 is an enlarged longitudinal cross-sectional view, similar to FIG. 11, of a portion of the cable but in which the sealing element has been deformed by the spacers due to the installation of the cable within the hub;

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
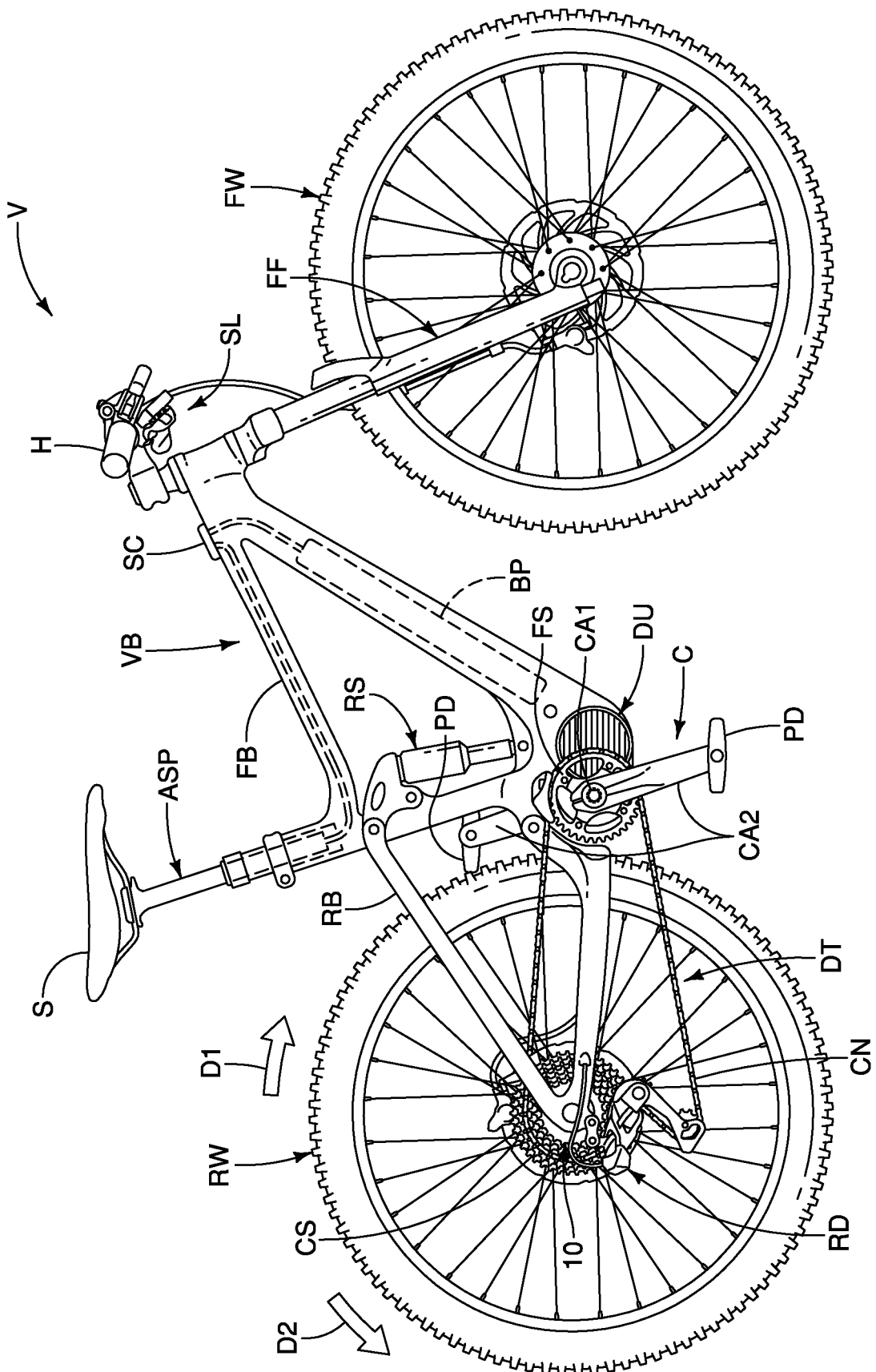
FIG. 1 is a side elevational view of a human-powered vehicle (i.e., bicycle) equipped with a hub (i.e., a bicycle hub) in accordance with a first embodiment.

Referring initially to FIG. 1, a hub 10 is provided to a human-powered vehicle V. In other words, the human-powered vehicle V (i.e., a bicycle) is illustrated that is equipped with the hub 10 in accordance with an illustrated embodiment. Here, in the illustrated embodiment, the hub 10 is a bicycle hub. More specifically, the hub 10 is a bicycle rear hub. Also, here, in the illustrated embodiment, the hub 10 is a hub dynamo for providing electric power to one or more components of the bicycle V. However, the hub 10 is not limited to a hub dynamo. In particular, certain aspects of the hub 10 can be provided that does not generate electric power. Also, while the hub 10 is illustrated as a rear hub, certain aspects of the hub 10 can be provided to a front hub. Thus, the hub 10 is not limited to a rear hub.

Here, the bicycle V is an electric assist bicycle (E-bike). Alternatively, the bicycle V can be a road bicycle, a city bike, a cargo bike, and a recumbent bike, or another type of off-road bicycle such as a cyclocross bicycle. As seen in FIG. 1, the bicycle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column or a steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The bicycle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CAL A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the bicycle V in a conventional manner. The electric drive unit DU is actuated, for example, in accordance with a human driving force applied to the pedals PD. The electric drive unit DU is actuated by electric power supplied from a main battery pack BP that is mounted on a downtube of the bicycle V. The main battery pack BP can provide electrical power to other vehicle components such as the rear derailleur RD, the height adjustable seatpost ASP, the rear shock absorber RS, the front fork FF and any other vehicle component that uses electrical power.

The bicycle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the bicycle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the bicycle V.

Here, the bicycle V further includes a rear derailleur RD that is attached to the rear frame body RB for shifting the chain CN between the rear sprockets CS. The rear derailleur RD is one type of gear changing device. Here, the rear derailleur RD is an electric derailleur (i.e., an electric gear changing device or an electric transmission device). Here, the rear derailleur RD is provided on the rear side of the rear frame body RB near the hub 10. The rear derailleur RD can be operated when a rider of the bicycle V manually operates a gear shift operating device or shifter SL. The rear derailleur RD can also be automatically operated based on traveling conditions and/or operating conditions of the bicycle V. The bicycle V can further include a plurality of electronic components. Some or all of the electronic components can be supplied with electric power generated by the hub 10 during a power generation state as discussed herein.

The structure of the hub 10 will now be described with particular reference to FIGS. 2 to 6. The hub 10 comprises a hub axle 12. Here, the hub 10 further comprises a hub body 14. The hub axle 12 is configured to be non-rotatably attached to the vehicle body VB. In this embodiment, the hub axle 12 is configured to be non-rotatably attached to the rear frame body RB. The hub axle 12 has a center axis A1. The hub body 14 is rotatably disposed around the center axis A1. The hub body 14 is rotatably disposed around the center axis A1. In other words, the hub body 14 is rotatably mounted around the hub axle 12.

Figure 2:
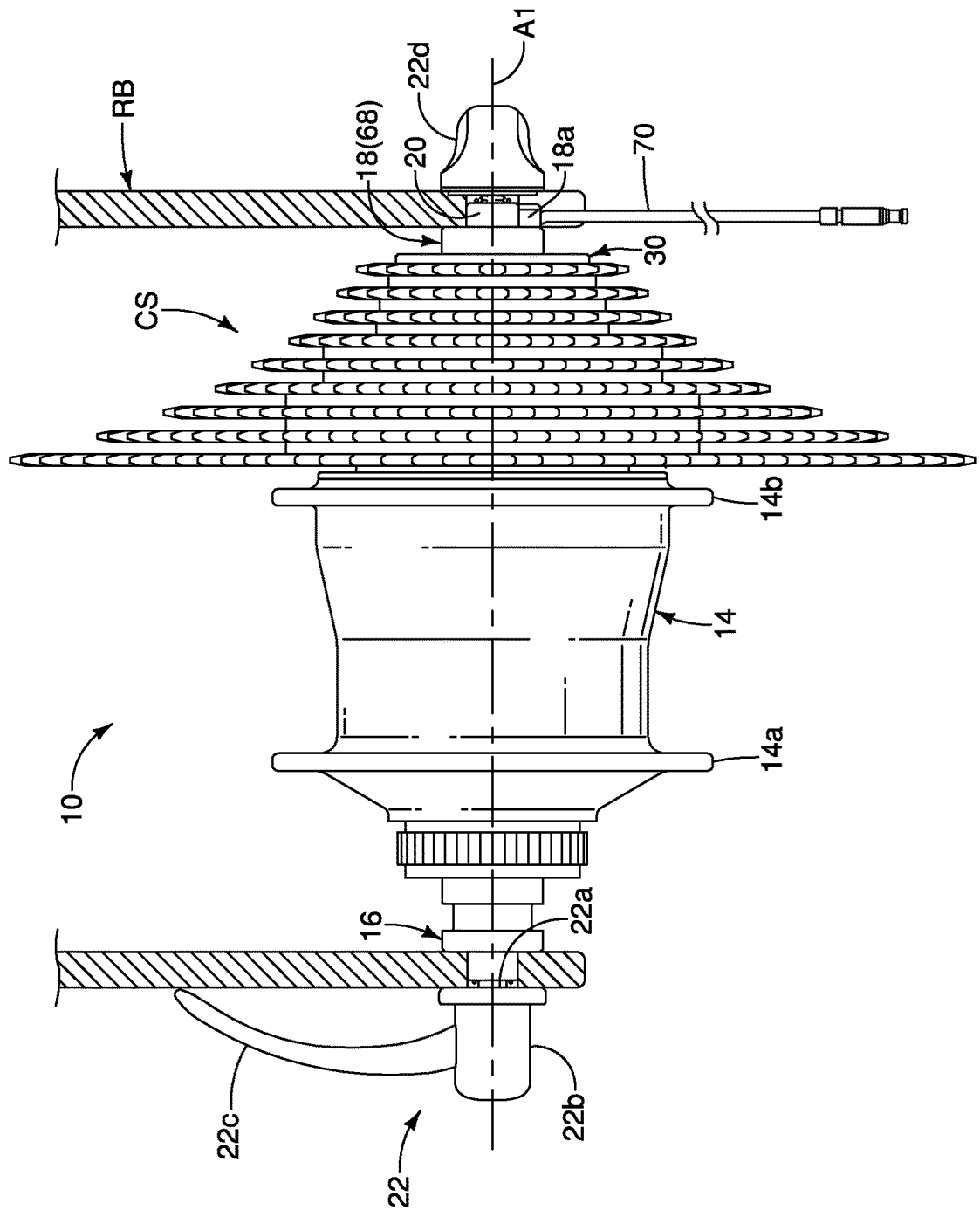
FIG. 2 is a longitudinal elevational view of the hub attached to the vehicle body of the human-powered vehicle illustrated in FIG. 1.
Figure 4:
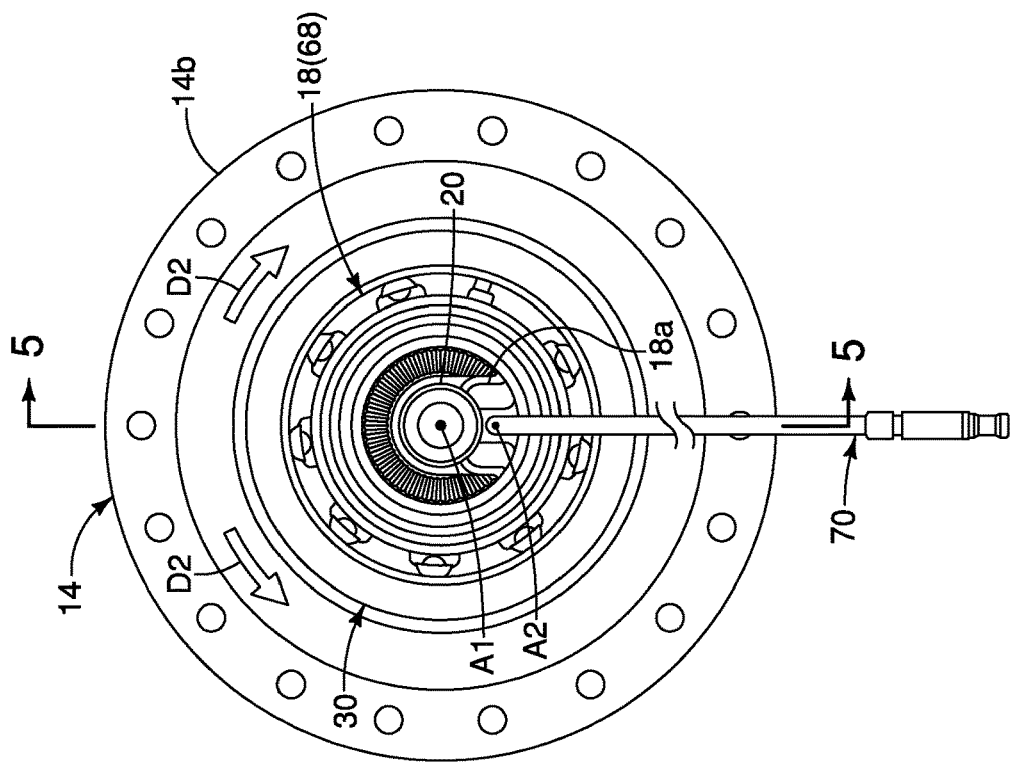
FIG. 4 is an end elevational view of the hub illustrated in FIGS. 2 and 3.
Figure 5:
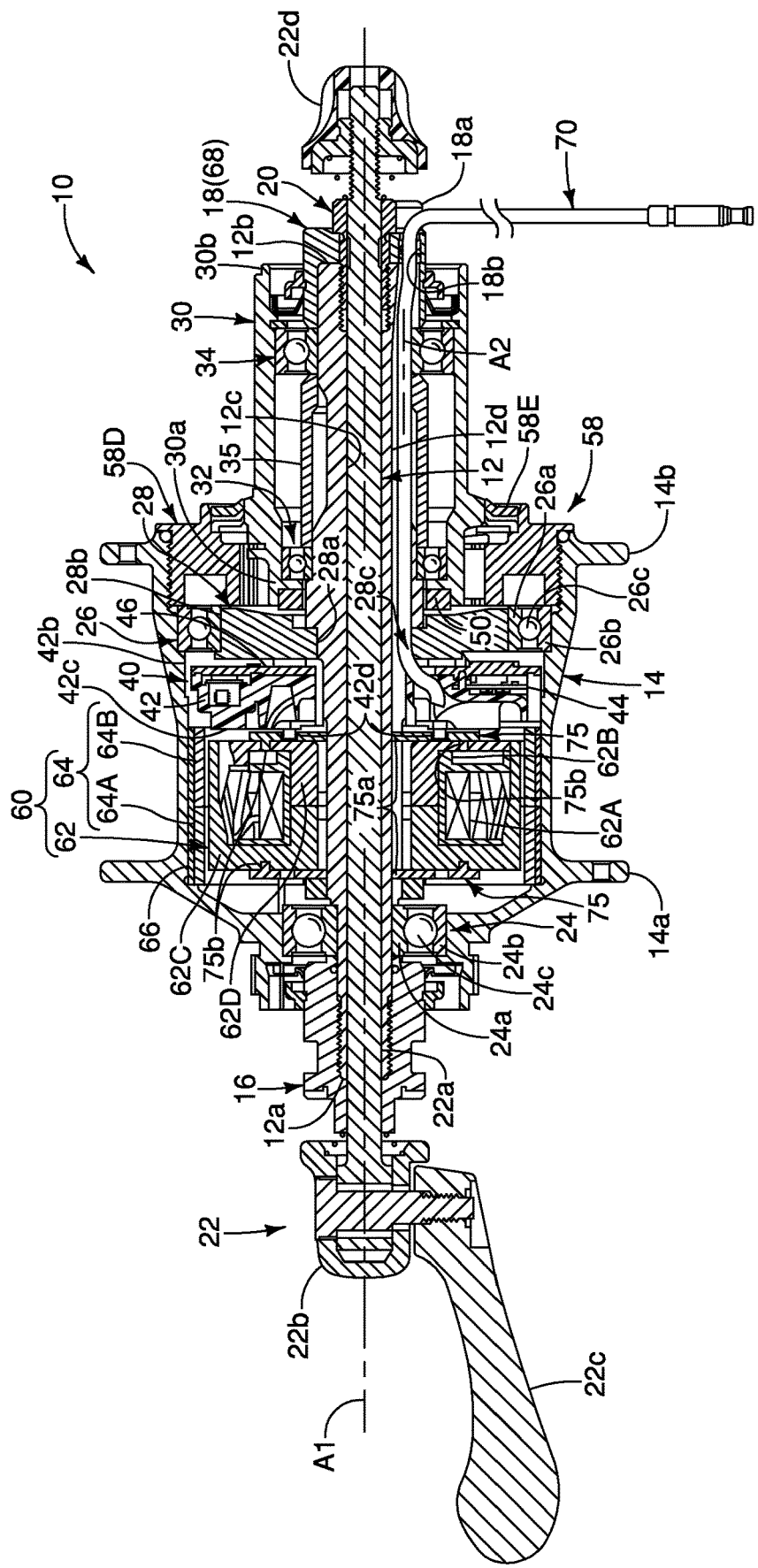
FIG. 5 is a longitudinal cross-sectional view of the hub illustrated in FIGS. 2 to 4 as seen along section line 5-5 in FIG. 4.

As seen in FIG. 5, the hub axle 12 is a rigid member made of a suitable material such as a metallic material. Here, the hub axle 12 is a tubular member. The hub axle 12 has a first axial end 12a, a second axial end 12b and an axial bore 12c. The axial bore 12c extends between the first axial end 12a and the second axial end 12b. The hub axle 12 can be a one-piece member or made of several pieces. Here, the hub axle 12 is provided with a first end piece or end cap 16 and a second end piece or end cap 18. The first end cap 16 is mounted to the first axial end 12a (left side in FIGS. 2 to 5) of the hub axle 12, and the second end cap 18 is mounted to the second axial end 12b (right side in FIGS. 2 to 5) of the hub axle 12. For example, the first end cap 16 is threaded on the first axial end 12a of the hub axle 12, and the second end cap 18 is secured to the second axial end 12b of the hub axle 12 by a fixing bolt 20 that is threaded into the axial bore 12c of the hub axle 12. In this way, the first end cap 16 and the fixing bolt 20 are received in mounting openings of the rear frame body RB as seen in FIG. 2. Here, the second end cap 18 includes a rotation restriction part 18a which is also received in one of the mounting openings of the rear frame body RB. The rotation restriction part 18a engages the rear frame body RB so that rotation of the hub axle 12 relative to the rear frame body RB is restricted.

Here, as seen in FIGS. 2 and 5, the hub 10 further comprises a wheel holding mechanism 22 for securing the hub axle 12 of the hub 10 to the rear frame body RB. The wheel holding mechanism 22 basically includes a shaft or skewer 22a, a cam body 22b, a cam lever 22c and an adjusting nut 22d. The cam lever 22c is attached to one end of the skewer 22a via the cam body 22b, while the adjusting nut 22d is threaded on the other end of the skewer 22a. The lever 22c is attached to the cam body 22b. The cam body 22b is coupled between the skewer 22a and the cam lever 22c to move the skewer 22a relative to the cam body 22b. Thus, the lever 22c is operated to move the skewer 22a in the axial direction of the center axis A1 with respect to the cam body 22b to change the distance between the cam body 22b and the adjusting nut 22d. Preferably, a compression spring is provided at each end of the skewer 22a. Alternatively, the hub axle 12 can be non-rotatably attached to the rear frame body RB with other attachment structures as needed and/or desired.

Figure 3:
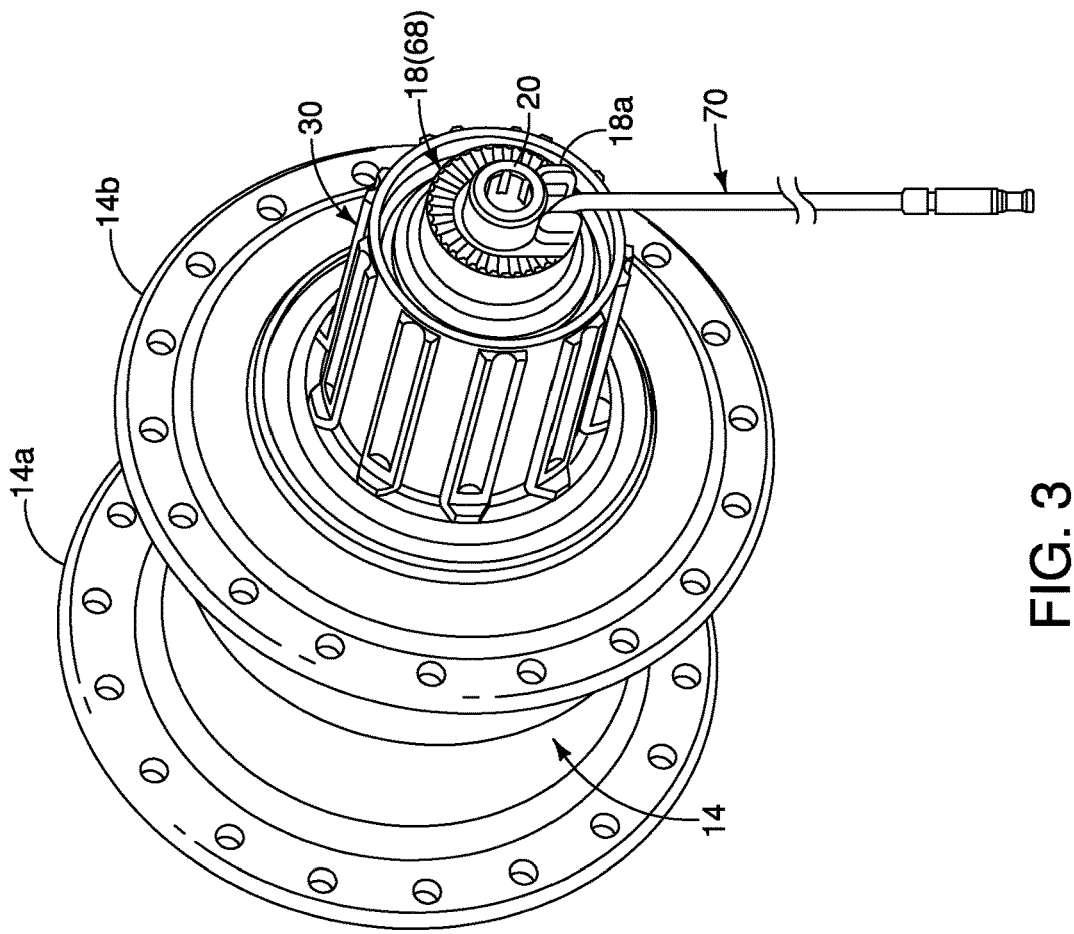
FIG. 3 is a perspective view of the hub illustrated in FIG. 1.

As indicated in FIGS. 1, 3 and 4, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the center axis A1 from a peripheral surface of the hub body 14. The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together.

As seen FIG. 5, the hub 10 further comprises a first hub body bearing 24. The first hub body bearing 24 rotatably supports the hub body 14. Preferably, the hub 10 further comprises a second hub body bearing 26 rotatably supporting an end of the hub body 14. The first hub body bearing 24 rotatably supports the other end of the hub body 14 with respect to the center axis A1. The first hub body bearing 24 includes a first inner race 24a, a first outer race 24b and a plurality of first roller elements 24c. The first roller elements 24c are disposed between the first inner race 24a and the first outer race 24b. The second hub body bearing 26 includes a second inner race 26a, a second outer race 26b and a plurality of second roller elements 26c. The second roller elements 26c are disposed between the second inner race 26a and the second outer race 26b. The first hub body bearing 24 and the second hub body bearing 26 are radial ball bearings.

Here, the hub 10 further comprises a bearing spacer 28. The bearing spacer 28 is provided on the hub axle 12 and supports the hub body 14 via a bearing. Here, the bearing spacer 28 supports the second hub body bearing 26. The bearing spacer 28 has an inner peripheral end 28a provided to the hub axle 12 and an outer peripheral end 28b spaced radially outward of the inner peripheral end 28 in a radial direction with respect to the center axis A1. The second hub body bearing 26 is disposed at the outer peripheral end 28b of the bearing spacer 28 and rotatably supports the hub body 14. The bearing spacer 28 is non-rotatable with respect to the hub axle 12. In particular, the inner peripheral end 28a defines a non-circular opening that mates with a non-circular portion of the hub axle 12 to non-rotatably couple the bearing spacer 28 with respect to the hub axle 12. The axial position of the bearing spacer 28 with respect to the hub axle 12 can be determined by being sandwiched between a step provided on the hub axle 12 and a nut screwed to the hub axle 12.

Here, the hub 10 further comprises a sprocket support structure 30. In the illustrated embodiment, the sprocket support structure 30 supports the rear sprockets CS as seen in FIG. 2. The sprocket support structure 30 is rotatably disposed around the center axis A1 to transmit a driving force to the hub body 14 while rotating in a driving rotational direction D1 around the center axis A1. As explained below, the sprocket support structure 30 does not transmit a driving force to the hub body 14 while rotating in a non-driving rotational direction D2 around the center axis A1. The non-driving rotational direction D2 is opposite to the driving rotational direction D1 with respect to the center axis A1. The rotational center axis of the sprocket support structure 30 is disposed concentrically with the center axis A1 of the hub axle 12.

While the sprocket support structure 30 is configured to non-rotatably support the rear sprockets CS, the sprocket support structure 30 is not limited to the illustrated embodiment. Alternatively, one or more of the rear sprockets CS can be integrally formed with the sprocket support structure 30. In any case, the sprocket support structure 30 and the rear sprockets CS are coupled together to rotate together in both the driving rotational direction D1 and the non-driving rotational direction D2.

The hub 10 further comprises a first sprocket support bearing 32 and a second sprocket support bearing 34. The first sprocket support bearing 32 rotatably supports a first end 30a of the sprocket support structure 30. The second sprocket support bearing 34 rotatably supports a second end 30b of the sprocket support structure 30. The first sprocket support bearing 32 and the second sprocket support bearing 34 have outer diameters that are smaller than the outer peripheral end 28b of the bearing spacer 28. The inner diameter of the first sprocket support bearing 32 is larger than the inner diameter of the second sprocket support bearing 34. Thus, the first sprocket support bearing 32 and the second sprocket support bearing 34 can be mounted on the hub axle 12 from the second axial end 12b of the hub axle 12. The first sprocket support bearing 32 includes a first inner race 32a, a first outer race 32b and a plurality of first roller elements 32c. The first roller elements 32c are disposed between the first inner race 32a and the first outer race 32b. The second sprocket support bearing 34 includes a second inner race 34a, a second outer race 34b and a plurality of second roller elements 34c. The second roller elements 34c are disposed between the second inner race 34a and the second outer race 34b. Here, the first sprocket support bearing 32 and the second sprocket support bearing 34 are radial ball bearings. A tubular spacing element 35 is disposed between the first sprocket support bearing 32 and the second sprocket support bearing 34.

Figure 6:
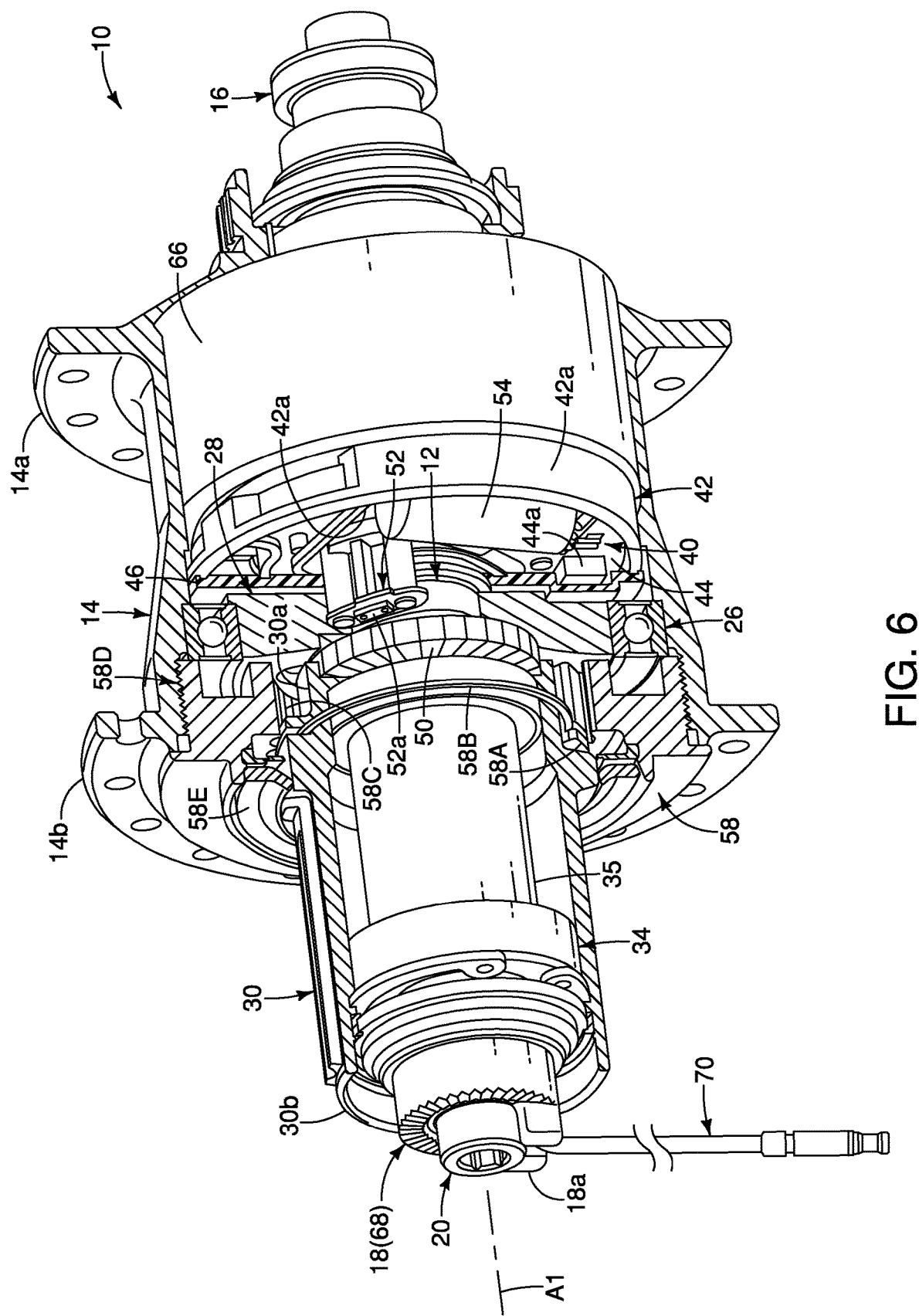
FIG. 6 is a perspective view of the hub illustrated in FIGS. 2 to 5 with portions of the hub broken away.

As seen in FIGS. 5 and 6, the hub 10 further comprises an electrical component 40. The hub 10 further comprises a housing 42 disposed in the hub body 14. The housing 42 is part of the electrical component 40. In other words, the electrical component 40 includes the housing 42.

Also, the hub 10 further comprises an electric circuit board 44 that is disposed in the hub body 14. In particular, the electric circuit board 44 is disposed in the housing 42. Also, a lid 46 is attached to the housing 42 for enclosing the electric circuit board 44 in the housing 42. Here, the lid 46 is bonded to the housing 42 by adhesive or welding. However, the lid 46 can be attached to the housing 42 by threaded fastener, rivets, etc. Preferably, the housing 42 and the lid 46 are rigid members made from a suitable material. For example, the housing 42 and the lid 46 are made of a resin material. For example, the housing 42 and the lid 46 can each be injected molded members.

The housing 42 is non-rotatable with respect to the hub axle 12. The housing 42 is configured to house the electrical component 40. In the illustrated embodiment, the electric circuit board 44 is disposed in the housing 42. In particular, the housing 42 has an outer peripheral surface 42a defining an internal space 42b in which the electric circuit board 44 is disposed. The lid 46 overlies the internal space 42b of the housing 42. The internal space 42b has a donut shape in that the hub axle 12 passes through a center area of the housing 42. In this way, the electric circuit board 44 is non-rotatable with respect to the hub axle 12. The electric circuit board 44 is arranged perpendicular to the center axis A1. The electric circuit board 44 is a part of the electrical component 40. The housing 42 includes an end wall portion 42c. The end wall portion 42c of the housing 42 includes a plurality of keying protrusions 42d. As described later, the keying protrusions 42d can be provided to engage a non-rotatable member that is provided to the hub axle 12 for non-rotatably coupling the housing 42 to the hub axle 12.

As seen in FIG. 6, the hub 10 further comprises a detected part 50 and a sensor 52. The detected part 50 is coupled to the sprocket support structure 30. On the other hand, the sensor 52 is disposed in the hub body 14. In particular, the sensor 52 is provided in the internal space 42b of the housing 42. The sensor 52 is electrically connected to the electric circuit board 44. The sensor 52 is also a part of the electrical component 40. Here, the sensor 52 includes a rotation detection sensor 52a. The rotation detection sensor 52a is configured to detect the detected part 50 to detect rotation of the sprocket support structure 30 around the center axis A1. Since the rotation detection sensor 52a is connected to the electric circuit board 44, the rotation detection sensor 52a are non-rotatable with respect to the hub axle 12. As seen in FIG. 6, the rotation detection sensor 52a is disposed in the hub body 14 at a location spaced radially outward from the hub axle 12.

In the illustrated embodiment, the rotation detection sensor 52a includes a magnetic sensor, and the detected part 50 includes a magnet. Thus, the magnetic sensor detects movement of the magnet, which rotates together with the sprocket support structure 30. In other words, with this arrangement, the rotation detection sensor 52a is configured to detect the detected part 50 to detect rotation of the sprocket support structure 30 around the center axis A1. Here, the magnet of the detected part 50 is an annular member with alternating S-pole sections and N-pole sections. In this way, the rotation detection sensor 52a can detect a rotational amount and a rotational direction of the sprocket support structure 30. However, the detected part 50 is not limited to the illustrated annular member. For example, the detected part 50 can be formed of a single non-annular magnet, or two or more magnets that are circumferentially spaced apart about the center axis A1. In the case of using two or more circumferentially spaced magnets, a back yoke can be provided and the circumferentially spaced magnets can be provided to the back yoke. In this way, the circumferentially spaced magnets can be easily installed in the hub 10. The term "sensor" as used herein refers to a hardware device or instrument designed to detect the presence or absence of a particular event, object, substance, or a change in its environment, and to emit a signal in response. The term "sensor" as used herein do not include a human.

The electric circuit board 44 further includes an electronic controller 44a that provided on the electric circuit board 44. The electronic controller 44a is configured to receive a detection signal from the rotation detection sensor 52a. The electronic controller 44a includes at least one processor that executes predetermined control programs. The at least one processor can be, for example, a central processing unit (CPU) or a micro processing unit (MPU). The term "electronic controller" as used herein refers to hardware that executes a software program, and does not include a human. Preferably, the electric circuit board 44 further includes a data storage device (memory) that provided on the electric circuit board 44. The data storage device (memory) stores various control programs and information used for various control processes including power generation control, power storage control, hub rotation detection control, etc. The data storage device includes any computer storage device or any non-transitory computer-readable medium with the sole exception of a transitory, propagating signal. For example, the data storage device includes a nonvolatile memory and a volatile memory. The nonvolatile memory includes, for example, at least one of a read-only memory (ROM), an erasable programmable read only memory (EPROM), an electrically erasable programmable read-only memory (EE-PROM), and a flash memory. The volatile memory includes, for example, a random access memory (RAM).

Here, the hub 10 further comprises at least one capacitor 54. The capacitor 54 is an electric power storage of the electrical component 40. In other words, the capacitor 54 is also a part of the electrical component 40. The capacitor 54 is preferably disposed in the housing 42 of the hub 10. Thus, the capacitor 54 is part of the electrical component 40. The electric circuit board 44 is electrically connected to the capacitor 54. In this way, the capacitor 54 provides electrical power to the electric circuit board 44 and other electrical components electrically connected to the electric circuit board 44. For example, the capacitor 54 provides electrical power to the sensor 52. Also, the electronic controller 44a of the electric circuit board 44 is configured to control the input and output of electric power from the capacitor 54.

As seen in FIGS. 5 and 6, the lid 46 is coupled to the housing 42 to protect the electric circuit board 44 and the capacitor 54. The lid 46 overlies the internal space 42b of the housing 42. Thus, at least the housing 42, the electric circuit board 44, the capacitor 54 and the lid 46 can be considered to constitute an electrical unit that is disposed in the hub body 14.

As seen in FIGS. 5 and 6, the hub 10 further comprises a one-way clutch 58 that is formed between the hub body 14 and the sprocket support structure 30. The one-way clutch 58 includes a plurality of pawls 58A disposed between the hub body 14 and the sprocket support structure 30. The one-way clutch 58 further includes a biasing element 58B that couples the pawls 58A to the sprocket support structure 30. The one-way clutch 58 further includes a plurality of ratchet teeth 58C. The ratchet teeth 58C are provided to a fixing ring 58D that is fixed to the hub body 14. The ratchet teeth 58C are provided on the inner peripheral surface of the fixing ring 58D. The fixing ring 58D is screwed to the hub body 14. The fixing ring 58D is made of a hard material such as metal. The fixing ring 58D abuts against the outer race 26b of the second hub body bearing 26 in the axial direction with respect to the center axis A1. The opposite side of the outer race 26b of the second hub body bearing 26 in the axial direction abuts against a step formed in the hub body 14. The outer race 26b of the second hub body bearing 26 is restricted in axial movement by the fixing ring 58D and the steps formed on the hub body 14. The biasing element 58B biases the pawls 58A into engagement with the ratchet teeth 58C of the fixing ring 58D. The biasing element 58B squeezes the pawls 54 against the sprocket support structure 30 such that the pawls 54 pivot towards engagement with the ratchet teeth 58C of the fixing ring 58D. A seal member 58E is provided on the fixing ring 58D. The seal member 58E is formed in a ring shape. The tongue portion of the sealing member 58E is in contact with the outer peripheral surface of the sprocket support 30.

In this way, the sprocket support structure 30 is coupled to the hub body 14 to rotate together in the driving rotational direction D1 around the center axis A1. Also, in a case where the sprocket support structure 30 is rotated in the non-driving rotational direction D2, the ratchet teeth 58C of the sprocket support structure 18 push the pawls 58A and pivot the pawls 58A to a retracted position against the sprocket support structure 30. Thus, the sprocket support structure 30 is configured to rotate relative to the hub body 14 in the non-driving rotational direction D2 around the center axis A1. In this way, the sprocket support structure 30 and the one-way clutch 58 form a freewheel that is commonly used in bicycles. Since the basic operation of the freewheel is relatively conventional, the freewheel will not be discussed or illustrated in further detail.

As seen in FIG. 5, the hub 10 further comprises an electric power generator 60. The electric power generator 60 is provided to the hub body 14, and is configured to generate electric power by rotation of the hub body 14. More specifically, the electric power generator 60 is provided to the hub body 14 between the hub axle 12 and a center portion of the hub body 14. The electric power generator 60 is configured to generate electric power by rotation of the hub body 14 relative to the hub axle 12. The electronic controller 44a of the electric circuit board 44 is electrically connected to the electric power generator 60 for controlling the electric power output of the electric power generator 60. Thus, the electric power generated by the electric power generator 60 can be stored and/or supplied directly to other components such as the rotation detection sensor 52a, the rear derailleur RD, etc.

The electric power generator 60 basically includes an armature 62 (i.e., a stator in the illustrated embodiment) and a magnet 64 (i.e., a rotor in the illustrated embodiment). While the armature 62 is illustrated as being fixed with respect to the hub axle 12 and the magnet 64 is illustrated as being fixed with respect to the hub body 14, the armature 62 can be fixed with respect to the hub body 14 and the magnet 64 can be fixed with respect to the hub axle 12. The armature 62 includes a winding coil 62A and a bobbin 62B. The armature 62 further includes a first yoke 62C and a second yoke 62D. The winding coil 62A is wound on the bobbin 62B for supporting the winding coil 62A. The first yoke 62C includes two or more first yoke pieces that are arranged in the circumferential direction of the hub axle 12. Likewise, the second yoke 62D includes two or more second yoke pieces that are arranged in the circumferential direction of the hub axle 12 and that alternate with the first yoke pieces of the first yoke 62C. The winding coil 62A is located between the first yoke 62C and the second yoke 62D in the axial direction of the hub axle 12.

The magnet 64 includes a plurality of first magnet parts 64A and a plurality of second magnet parts 64B arranged inside a tubular support 66. The tubular support 66 is fixedly coupled to the inside of the hub body 14 so that the magnet 64 and the hub body 14 rotate together around the hub axle 12. The tubular support 66 has the function of a back yoke. The back yoke is a member having a high magnetic permeability, which is arranged on the opposite side of the magnetized surface. By using the back yoke, a high generated magnetic field can be obtained. The tubular support 66 can be omitted. Alternatively, the hub body 14 can have the magnet 64 such that the hub body 14 partially forms the electric power generator 60. The first magnet parts 64A and the second magnet parts 64B are arranged so that S-poles and N-poles of the first magnet parts 64A and the second magnet parts 64B are alternately arranged in the circumferential direction of the hub axle 12. Therefore, the S-poles of the first magnet parts 64A are not aligned with the S-poles of the second magnet parts 64B, and the N-poles of the first magnet parts 64A are not aligned with the N-poles of the second magnet parts 64B in the axial direction of the hub axle 12.

Also, the hub 10 further comprises a member 68, a cable 70 and a sealing element 72. The cable 70 extends through a passageway 74. The sealing element 72 is configured to occupy a space between the passageway 74 and the cable 70. Thus, the sealing element 72 is configured to seal a space in the passageway 74 between the passageway 74 and the cable 70 to prevent contaminants from entering the hub 10. The sealing element 72 is provided on the cable 70 for sealing an interface between the passageway 74 and the cable 70.

Preferably, the member 68 is provided to the hub axle 12. In the first embodiment, the member 68 defines the passageway 74. In particular, the member 68 includes the end cap 18 that is provided on one end of the hub axle 12. The end cap 18 includes an opening 18b as the passageway 74 in which the cable 70 extends through. However, the member 68 is not limited to the end cap 18. Rather, the member 68 can be any suitable part of the hub 10 that assists in the sealing of a space in the passageway 74 between the passageway 74 and the cable 70.

Here, the cable 70 is an electrical cable. However, it will be apparent from this disclosure that the sealing element 72 can be used with other types of cables other than an electrical cable. The cable 70 is electrically coupled to the electric power generator 60. Also, the cable 70 is electrically coupled to the electrical component 40. The cable 70 is electrically connected at one end to the electric circuit board 44, which in turn is connected to the electric power generator 60. The other end of the cable 70 is electrically connected to another electrical component of the human-powered vehicle V such as the rear derailleur RD, the battery pack BP or an electrical junction. In this way, the cable 70 can provide electric power generated by the hub 10 to the rear derailleur RD, the battery pack BP or another electrical component. The cable 70 can also be used to transmit signals from the electronic controller 44a of the electric circuit board 44 to the rear derailleur RD or another electrical component using power line communication (PLC).

The cable 70 enters the hub 10 thorough the opening 18b of the end cap 18. Then, the cable 70 extends axially along the hub axle 12 and passes through a center opening 28c of the bearing spacer 28. The cable 70 enters the housing 42 of the electrical component 40 through the lid 46. In the housing 42 of the electrical component 40, the cable 70 is electrically connected to the electric circuit board 44. Preferably, as in the first embodiment, the cable 70 is disposed in an axially extending recess or groove 12d of the hub axle 12. The axially extending recess or groove 12d at least extends from the second axial end 12b to inside the housing 42 of the electrical component 40. Here, the groove 12d extends from the second axial end 12b past the electric power generator 60.

The hub 10 further includes two fixing plates 75 that are provided on the hub axle 12 for non-rotatably coupling the electric power generator 60 to the hub axle 12. The fixing plates 75 are provided on opposite axial ends of the electric power generator 60. The fixing plates 75 have a plate shape. Each of the fixing plates 75 includes a protrusion 75a that is disposed in the groove 12d of the hub axle 12. By inserting the protrusions 75a into the groove 12d of the hub axle 12, the fixing plates 75 do not rotate with respect to the hub axle 12. The electric power generator 60 does not rotate with respect to the hub axle 12 by engaging with protrusions 75b protruding from an axially facing surface of the fixing plate 75. The fixing plates 75 are arranged so as to sandwich the electric power generator 60 from both sides in the axial direction of the electric power generator 60. The rotation of the fixed plates 75 with respect to the hub axle 12 are also suppressed by providing D-shaped cutouts that matches a corresponding outer surface of the hub axle 12. One of the pair of fixing plates 75 can be omitted.

Also, the housing 42 can be non-rotatably coupled to one of the fixing plates 75 for suppressing rotation of the housing 42 with respect to the hub axle 12. For example, the keying protrusions 42d of the housing 42 are configured to engage openings one of the fixing plates 75 that is keyed to the groove 12d of the hub axle 12. The fixing plate 76 includes a plurality of openings corresponding to the plurality of protrusions 42d. In this way, the housing 42 is prevented from rotating relative to the hub axle 12. Alternatively, the housing 42 can be attached to the bearing spacer 28, which is non-rotatably coupled to the hub axle 12.

In first embodiment, the sealing element 72 is an elastic ring. In other words, the sealing element 72 is an O-ring or annular ring that is made of an elastomeric sealing material. For a cable with a circular cross section, the O-ring is suitable as sealing element. For example, in the case of a flat cable, a sealing element with a rectangular or oval opening can be used. Preferably, the elastomeric sealing material of the sealing element 72 is resilient such that the sealing element 72 can be deformed during installation and will return to substantially its original shape when removed from the hub 10. For example, the elastomeric sealing material of the sealing element 72 can be a resilient rubber. However, the sealing element 72 is not limited to an elastic ring as disclosed. The sealing element 72 can be made of a non-resilient moldable sealing material such as putty in addition to a solid substance such as rubber. Also, the sealing element 72 can be formed of a plurality of parts that together can form a seal.

Figure 7:
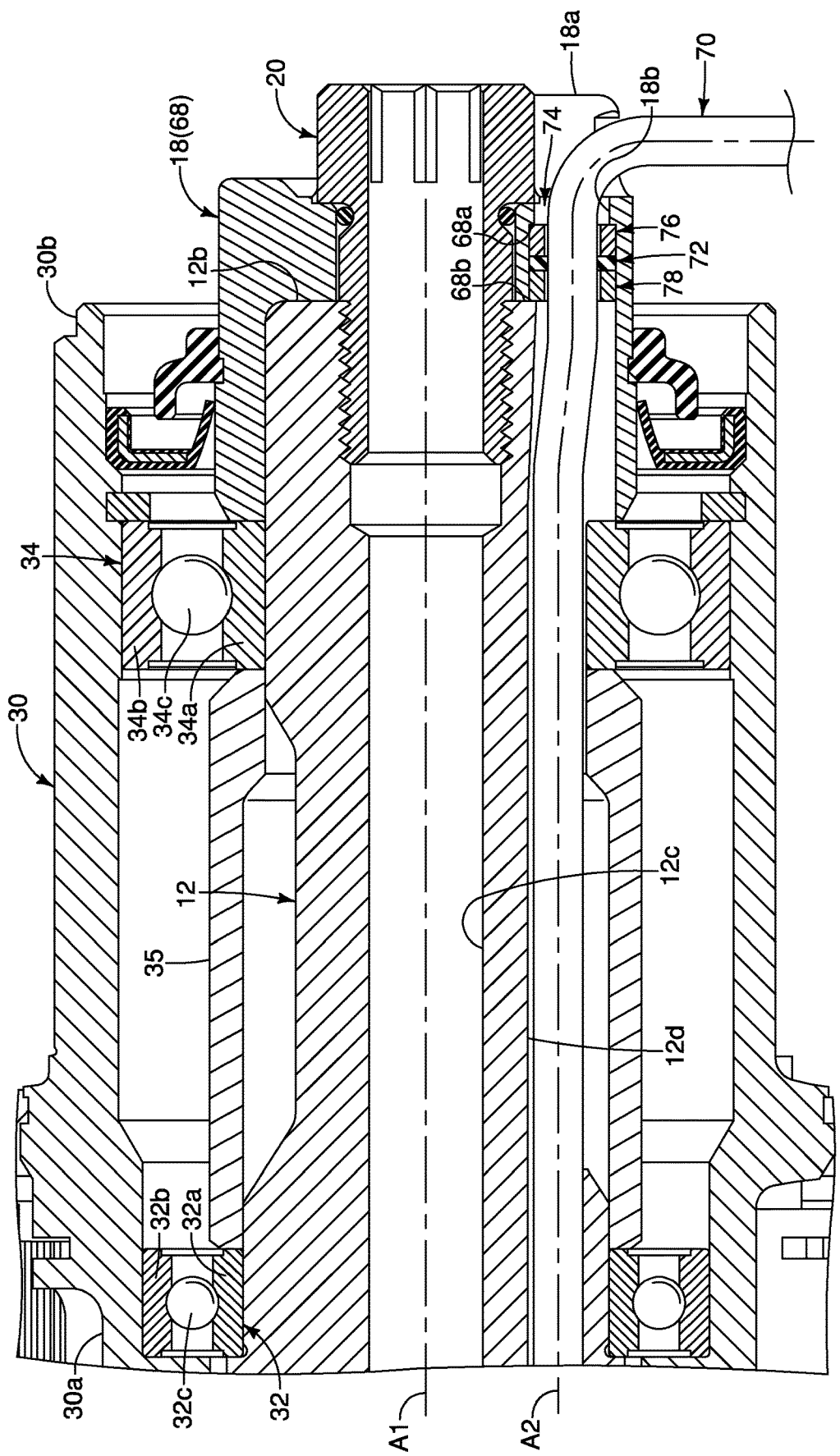
FIG. 7 is an enlarged longitudinal cross-sectional view of a portion of the hub illustrated in FIG. 5.
Figure 8:
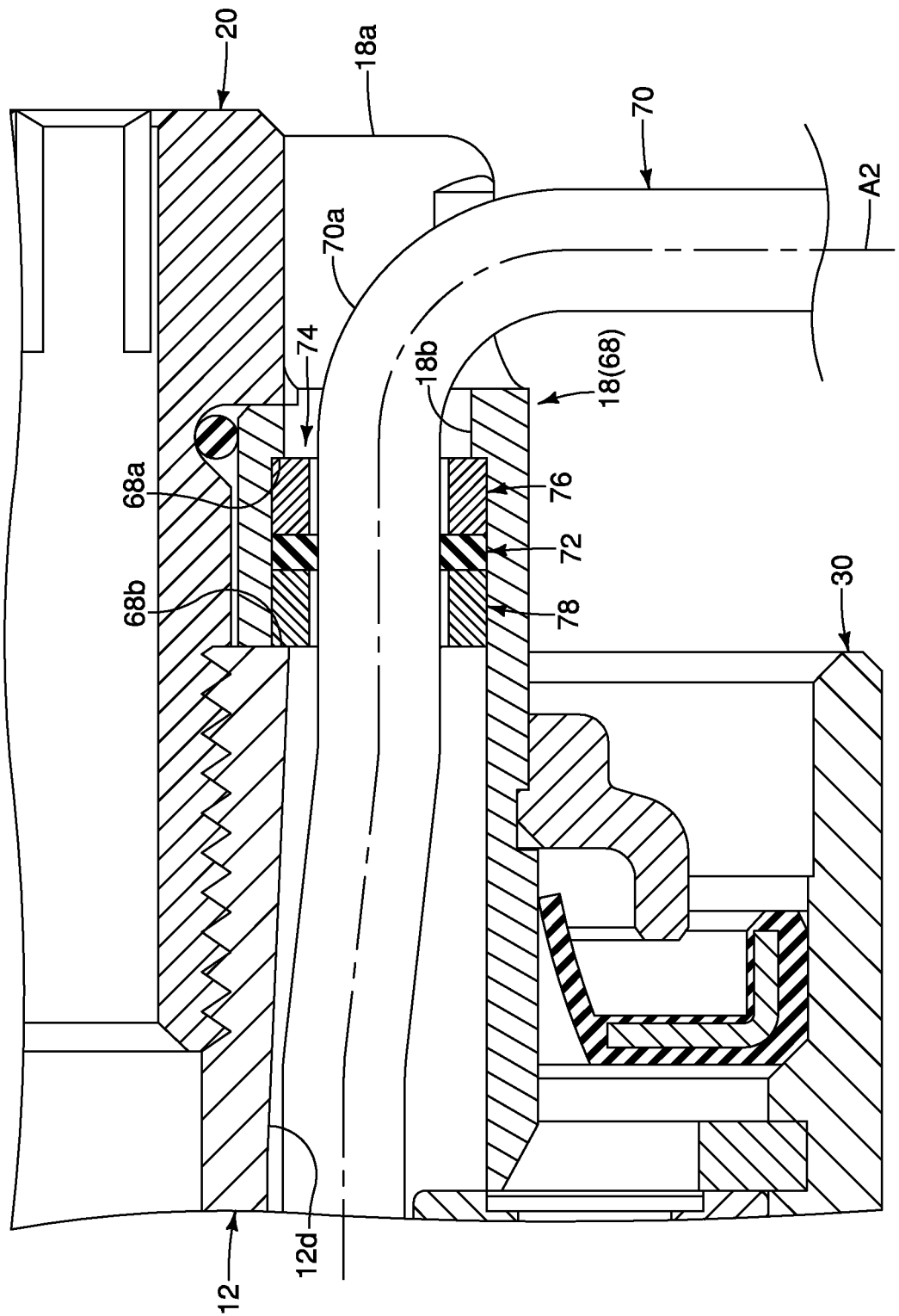
FIG. 8 is a further enlarged longitudinal cross-sectional view of a portion of the hub illustrated in FIG. 7.
Figure 9:
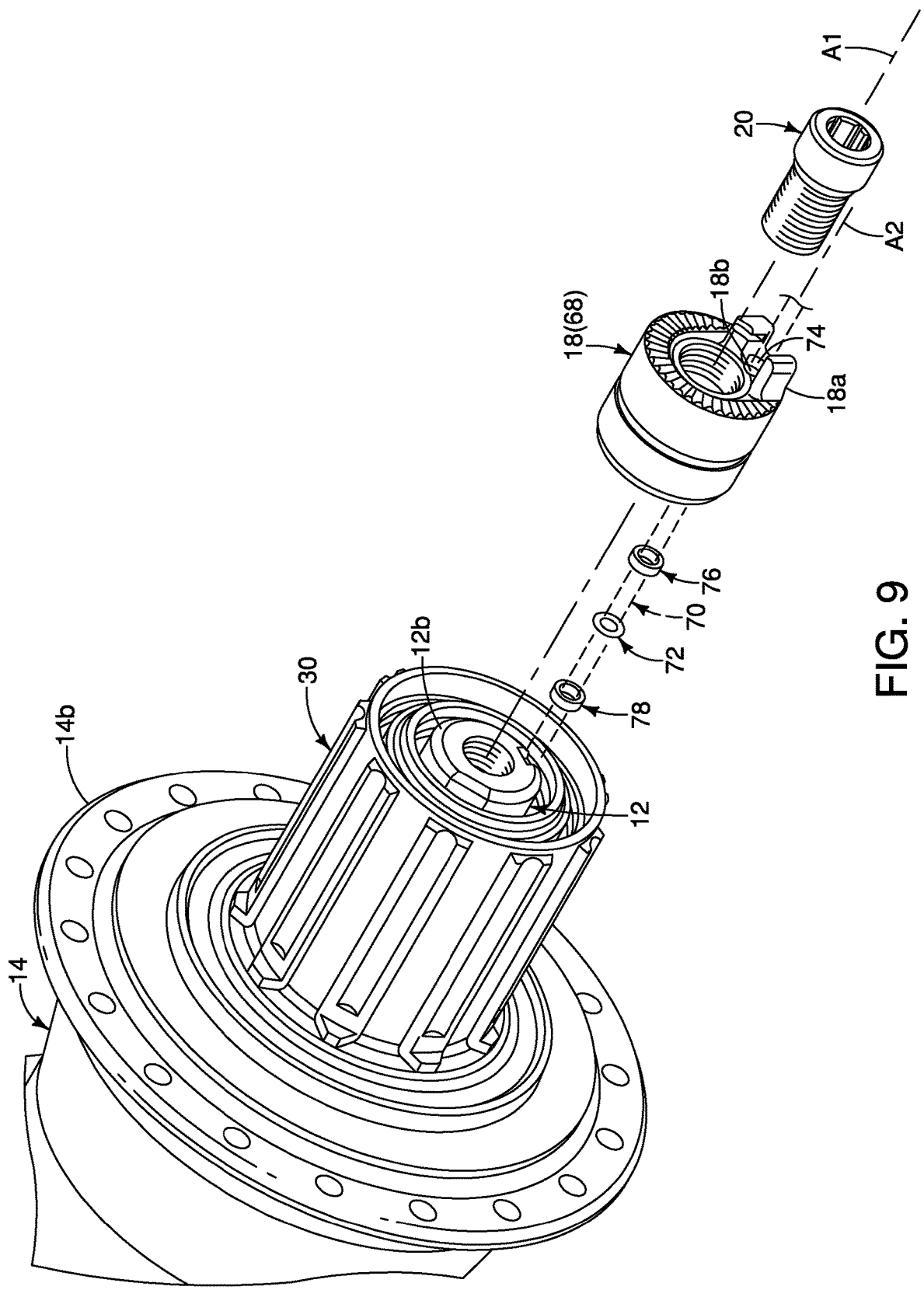
FIG. 9 is a partially exploded perspective view of selected parts of the hub illustrated in FIGS. 2 to 8.
Figure 10:
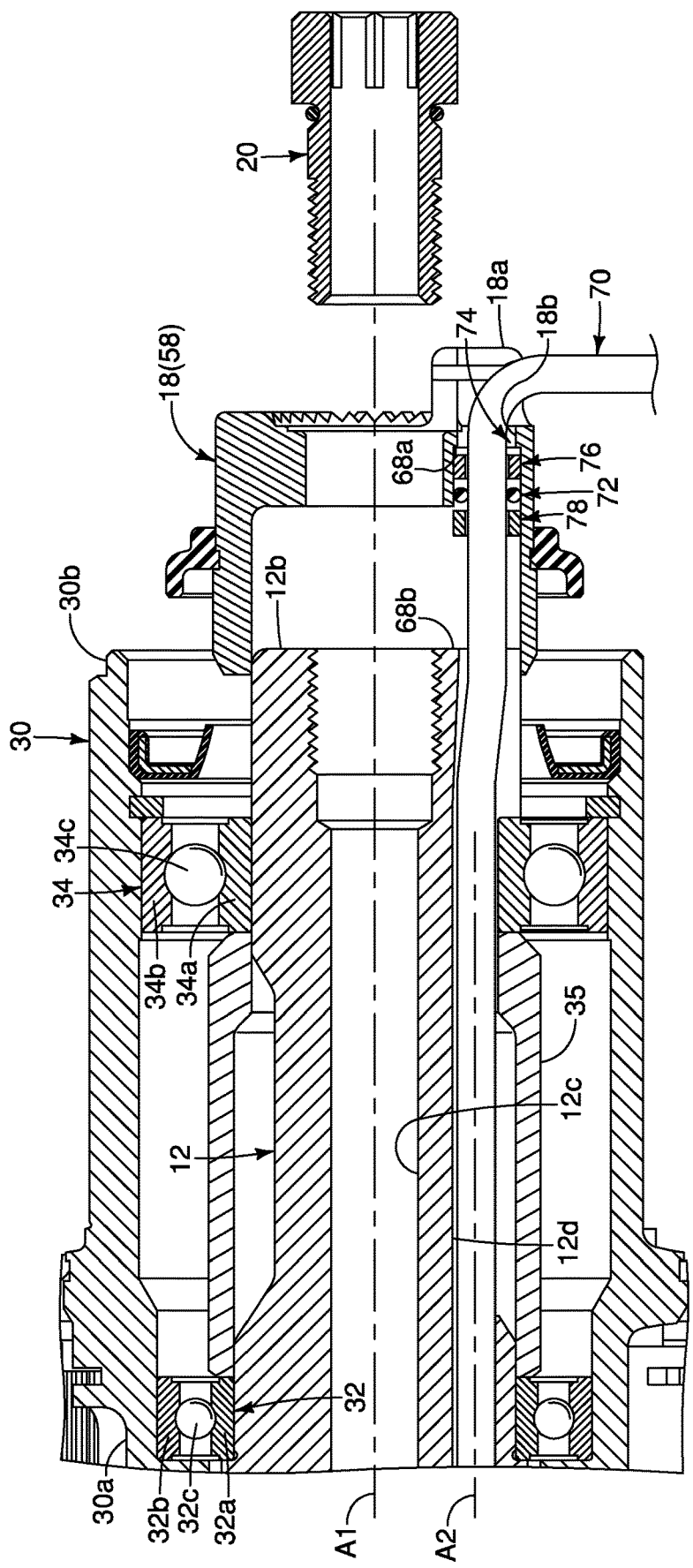
FIG. 10 is a partially exploded cross-sectional view of selected parts of the hub illustrated in FIGS. 2 to 8.
Figure 13:
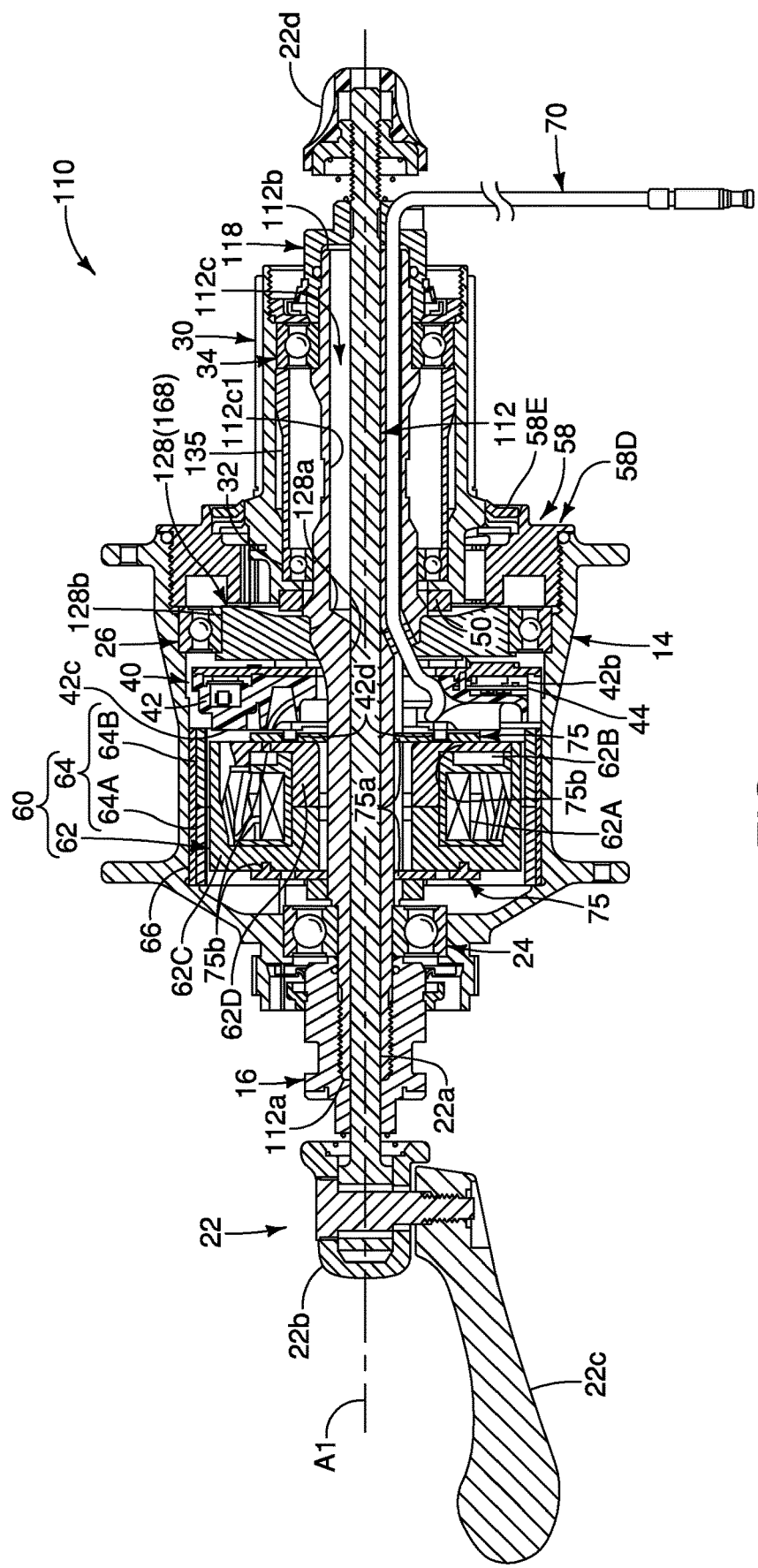
FIG. 13 is a longitudinal cross-sectional view of a hub in accordance with a second embodiment.
Figure 14:
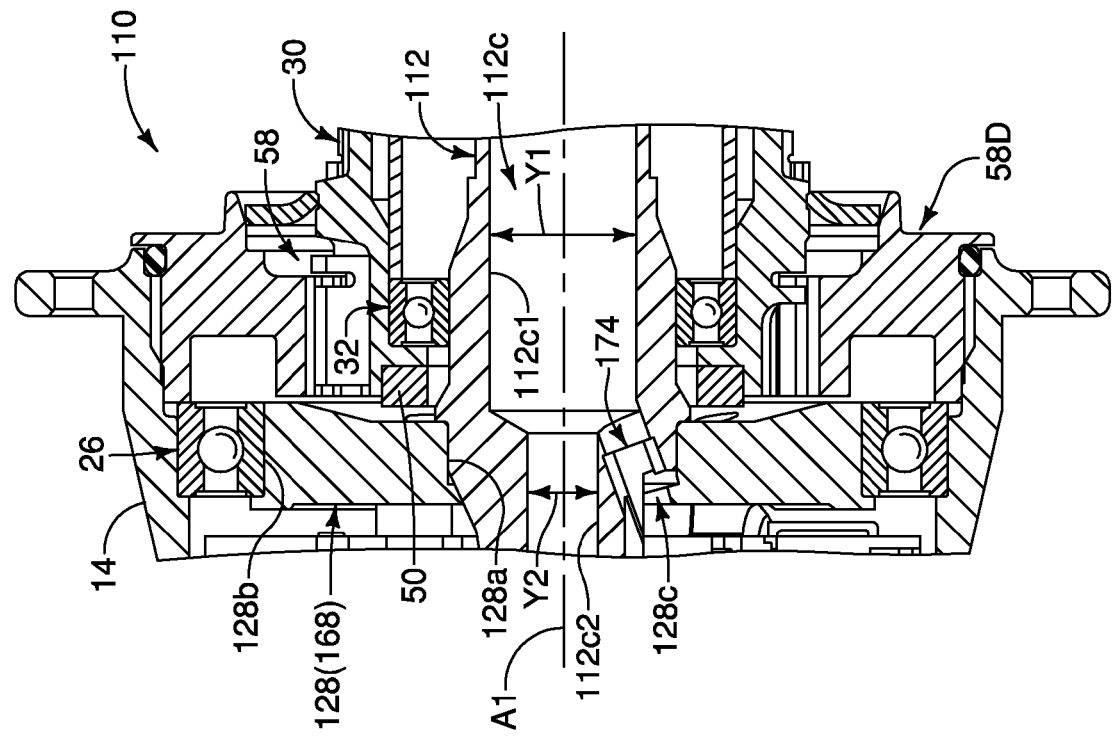
FIG. 14 is an enlarged partial cross-sectional view of a portion of the hub illustrated in FIG. 13.
Figure 15:
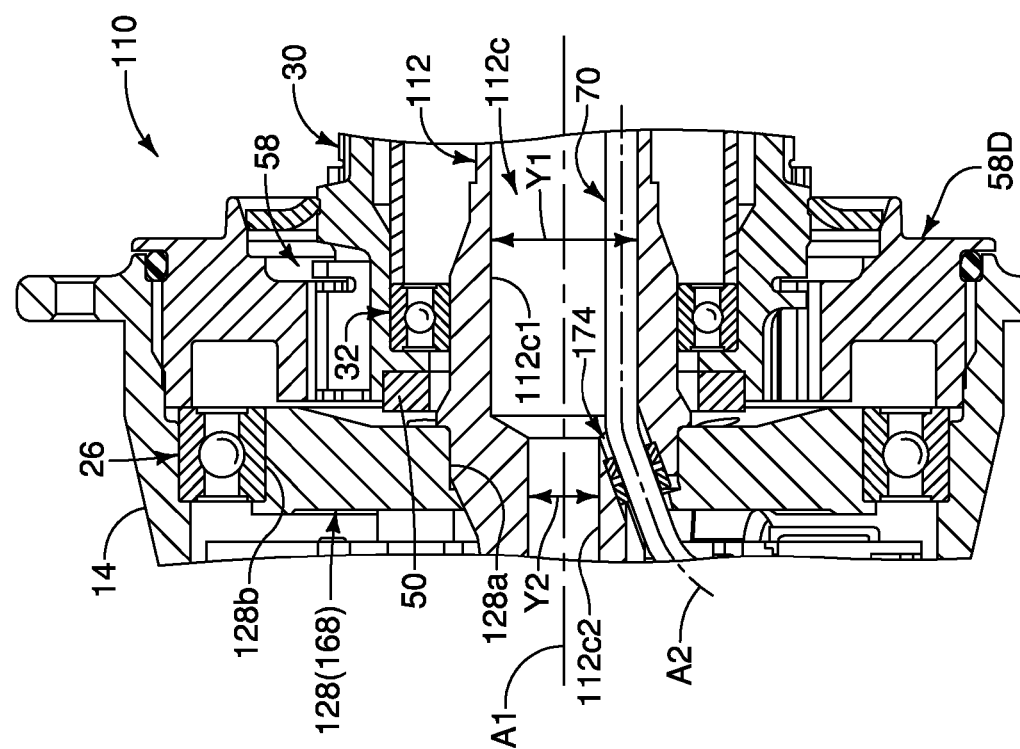
FIG. 15 is an enlarged partial cross-sectional, similar to FIG. 14, of portion of the hub illustrated in FIG. 13, but in which the cable, the sealing element and the spacers have been removed.
Figure 16:
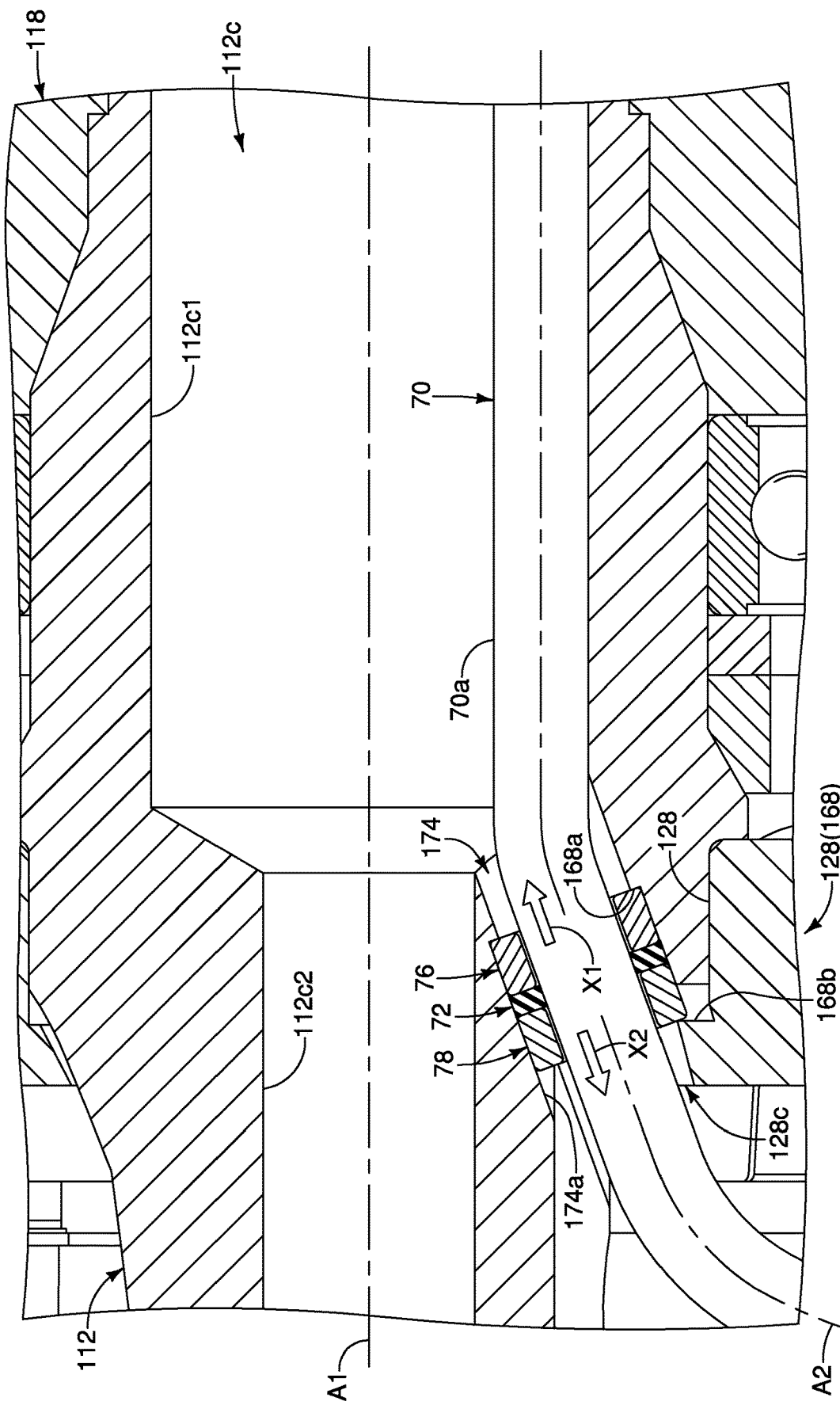
FIG. 16 is a further enlarged partial cross-sectional view of a portion of the hub illustrated in FIG. 13.

Preferably, as seen in FIGS. 7 and 8, the hub 10 further comprises a first spacer 76 and a second spacer 78. The first spacer 76 is located on a first axial side of the sealing element 72 with respect to a cable center axis A2 of the cable 70. The second spacer 78 is located on a second axial side of the sealing element 72 with respect to the cable center axis A2. The second axial side is opposite from the first axial side with respect to the cable center axis A2. The sealing element 72 abuts against the first spacer 76 and the second spacer 78. The first side is the side in the first axial direction X1 with respect to the sealing element 72. The second side is the side in the second axial direction X2 with respect to the sealing element 72.

Referring to FIGS. 8, 11 and 12, the sealing element 72 has an inner peripheral surface 72a and an outer peripheral surface 72b. The terms "inner" and "outer" as used to describe the sealing element 72 refers a positional relationship with respect to a center of the sealing element 72. Here, the center of the sealing element 72 corresponds to the cable center axis A2 in a case where the sealing element 72 is installed on the cable 70. Thus, the term "inner" as used to describe the sealing element 72 refers to a part or area facing, inside of the sealing element 72 or being positioned closer to the cable center axis A2 in a case where the sealing element 72 is installed on the cable 70. On the other hand, the term "outer" as used to describe the sealing element 72 refers to a part or area facing away, outside of the sealing element 72, or being farther from the cable center axis A2 in a case where the sealing element 72 is installed on the sealing element 72.

Prior to installation of the sealing element 72 into the passageway 74, as seen in FIG. 11, the inner peripheral surface 72a is equal to or slightly smaller than the outer diameter of the cable 70, while the outer peripheral surface 72b slightly smaller than the outer diameter of the passageway 74. In this way, during the assembly process of the hub 10, the seal element 72 is held in place on the cable 70 while there is a small gap between the seal element 72 and the passageway 74 to facilitate insertion of the seal element 72 into the opening 18b. In a case where the sealing element 72 is installed in the passageway 74 and the end cap 18 is attached to the hub axle 12 during the assembly process of the hub 10, the inner peripheral surface 72a of the sealing element 72 is deformed by receiving force along a cable center axis A2 of the cable 70, and the inner peripheral surface 72a of the sealing element 72 contacts with an exterior surface 70a of the cable 70. The inner peripheral surface 72a contacts the cable 70 and the outer peripheral surface 72b contacts the passageway 74. Also, in a case where the sealing element 72 is installed in the passageway 74 and the end cap 18 is attached to the hub axle 12 during the assembly process of the hub 10, the outer peripheral surface 72b of the sealing element 72 is deformed by receiving force along the cable center axis A2 of the cable 70, and the outer peripheral surface 72b of the sealing element 72 contacts with an inner surface 74a of the passageway 74.

In the first embodiment, the member 68 (i.e., the end cap 18) includes a first abutment 68a for limiting movement of the first spacer 76 in a first axial direction X1. On the other hand, the hub axle 12 includes a second abutment 68b for limiting movement of the second spacer 78 in a second axial direction X2 that is opposite to the first axial direction X1 with respect to the cable center axis A2. Thus the first spacer 76 abuts against the member 68 (i.e., the end cap 18) along the cable center axis A2, and the second spacer 78 abuts against the hub axle 12 along the cable center axis A2. In this way, during the assembly process of the hub 10, the first spacer 76 and the second spacer 78 are moved towards the sealing element 72 as the end cap 18 is attached to the hub axle 12 by the fixing bolt 20. As a result, the sealing element 72 is squeezed and deformed to create an inner seal and an outer seal. The inner seal is created between the inner peripheral surface 72a of the sealing element 72 and the cable 70. The outer seal is created between the outer peripheral surface 72b of the sealing element 72 and the inner surface 74a of the passageway 74.

Referring now to FIGS. 13 to 16, a hub 110 is illustrated in accordance with a second embodiment. The hub 110 is basically identical to the hub 10, discussed above, except that the hub axle 12, the end cap 18, the bearing spacer 28 and the tubular spacing element 35 have been replaced by a hub axle 112, an end cap 118, a bearing spacer 128 and a tubular spacing element 135. Also, in the second embodiment, the end cap 118 is provided on the hub axle 112 and the fixing bolt 20 has been omitted. Preferably, the end cap 118 includes an O-ring to frictionally suppress axial movement of the end cap 118 with respect to the hub axle 112. The end cap 118 has a non-circular bore (e.g., a D-cut shaped bore) that mates with a corresponding non-circular portion of the hub axle 112 so that the end cap 118 does not rotate with respect to the hub axle 112.

In view of the similarity between the first and second embodiments, the parts of the second embodiment that are identical or nearly identical to the parts of the first embodiment will be given the same reference numerals as the parts of the first embodiment. Moreover, the descriptions of the parts of the second embodiment that are identical to the parts of the first embodiment may be omitted for the sake of brevity.

Here, the hub body 14 and the sprocket support structure 30 are rotatably supported on the hub axle 112. The hub axle 112 non-rotatably supports the bearing spacer 128. The bearing spacer 128 is provided on the hub axle 112 and supports the hub body 14 via the second hub body bearing 26 in the same manner as the bearing spacer 28 of the first embodiment. The hub axle 112 also non-rotatably supports the electrical component 40 and the armature 62 of the electric power generator 60 in the same manner as the hub axle 12 of the first embodiment. Basically, the hub axle 112 has a first axial end 112a, a second axial end 112b and an axial bore 112c. The axial bore 112c extends between the first axial end 112a and the second axial end 112b for receiving the skewer 22a of the wheel holding mechanism 22. For example, the hub axle 112 is formed as a unitary, one-piece member.

In the second embodiment, the axial bore 112c has a first bore section 112c1 and a second bore section 112c2. The first bore section 112c1 has a first inner diameter Y1. The second bore section 12c2 has a second inner diameter Y2. The second inner diameter Y2 is smaller than the first inner diameter Y1. Here, the hub axle 112 defines a passageway 174 for receiving the cable 12. In particular, the passageway 174 communicates with the axial bore 112c at a location between the first axial end 112a and the second axial end 112b. More particular, the passageway 174 connects with the first bore section 112c1. Preferably, the passageway 174 extends non-perpendicularly to the axial bore 112c.

In the second embodiment, the sealing element 72, the first spacer 76 and the second spacer 78 are disposed in the passageway 174. Similar to the first embodiment, the first spacer 76 is located on a first axial side of the sealing element 72 with respect to a cable center axis A2 of the cable 70. The second spacer 78 is located on a second axial side of the sealing element 72 with respect to the cable center axis A2. The sealing element 72 abuts against the first spacer 76 and the second spacer 78. Thus, in a case where the sealing element 72 is installed in the passageway 174 during the assembly process of the hub 110, the inner peripheral surface 72a of the sealing element 72 is deformed by receiving force along the cable center axis A2 of the cable 70, and the inner peripheral surface 72a of the sealing element 72 contacts with the exterior surface 70a of the cable 70. The inner peripheral surface 72a contacts the cable 70 and the outer peripheral surface 72b contacts the passageway 174. Also, in a case where the sealing element 72 is installed in the passageway 174 during the assembly process of the hub 110, the outer peripheral surface 72b of the sealing element 72 is deformed by receiving force along the cable center axis A2 of the cable 70, and the outer peripheral surface 72b of the sealing element 72 contacts with an inner surface 174a of the passageway 174.

In the second embodiment, the hub 110 comprises a member 168 wherein the member 168 includes a bearing spacer that is provided on the hub axle 112 and supports the hub body 14 via a bearing. More specifically, in the second embodiment the member 168 includes the bearing spacer 128 that is provided on the hub axle 112 and supports the hub body 14 via the second hub body bearing 26. In the second embodiment, the hub axle 112 includes a first abutment 168a for limiting movement of the first spacer 76 in the first axial direction X1. On the other hand, the member 168 (i.e., the bearing spacer 128) includes a second abutment 168b for limiting movement of the second spacer 78 in the second axial direction X2. Thus, the first spacer 76 abuts against the hub axle 112 along the cable center axis A2, and the second spacer 78 abuts against the member 168 (i.e., the bearing spacer 128) along the cable center axis A2.

In this way, during the assembly process of the hub 110, the first spacer 76 and the second spacer 78 are moved towards the sealing element 72. As a result, the sealing element 72 is squeezed and deformed to create an inner seal and an outer seal. The inner seal is created between the inner peripheral surface 72a of the sealing element 72 and the cable 70. The outer seal is created between the outer peripheral surface 72b of the sealing element 72 and the inner surface 174a of the passageway 174.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub. Accordingly, these directional terms, as utilized to describe the hub should be interpreted relative to a human-powered vehicle (e.g., bicycle) in an upright riding position on a horizontal surface and that is equipped with the hub. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub for a human-powered vehicle; the hub comprising:
    a hub axle having a center axis;
    a member provided to the hub axle;
    a cable extending through a passageway; and
    a sealing element configured to occupy a space between the passageway and the cable, the sealing element being disposed between a first spacer and a second spacer with respect to the center axis of the hub axle, the sealing element having a first contact surface for contacting the first spacer, a second contact surface for contacting the second spacer, and a third contact surface for contacting an end cap.

2. The hub according to claim 1, wherein
    the sealing element has an inner peripheral surface contacting the cable and an outer peripheral surface contacting the passageway.

3. The hub according to claim 2, wherein
    the inner peripheral surface of the sealing element is deformed by receiving force along the cable center axis of the cable, and the inner peripheral surface of the sealing element contacts with an exterior surface of the cable.

4. The hub according to claim 2, wherein
    the outer peripheral surface of the sealing element is deformed by receiving force along the cable center axis of the cable, and the outer peripheral surface of the sealing element contacts with an inner surface of the passageway.

5. The hub according to claim 2, further comprising
    the first spacer located on the first axial side of the sealing element with respect to the cable center axis of the cable, and
    the second spacer located on the second axial side of the sealing element with respect to the cable center axis, the second axial side is opposite from the first axial side with respect to the cable center axis.

6. The hub according to claim 5, wherein
    the member includes a first abutment limiting movement of the first spacer in a first axial direction, and
    the hub axle includes a second abutment limiting movement of the second spacer in a second axial direction that is opposite to the first axial direction with respect to the cable center axis.

7. The hub according to claim 6, wherein
    the first spacer abuts against the member along the cable center axis, and
    the second spacer abuts against the hub axle along the cable center axis.

8. The hub according to claim 1, wherein
    the member defines the passageway.

9. The hub according to claim 8, wherein
    the member includes the end cap that is provided on one end of the hub axle, and
    the end cap includes an opening as the passageway in which the cable extends through.

10. The hub according to claim 1, wherein
    the hub axle defines the passageway.

11. The hub according to claim 10, wherein
    the member includes a bearing spacer that is provided on the hub axle and supports a hub body via a bearing.

12. The hub according to claim 10, wherein
    the hub axle has a first axial end, a second axial end and an axial bore extending between the first axial end and the second axial end, and the passageway communicates with the axial bore at a location between the first axial end and the second axial end.

13. The hub according to claim 12, wherein
    the axial bore has a first bore section and a second bore section,
    the first bore section has a first inner diameter,
    the second bore section has a second inner diameter,
    the second inner diameter is smaller than the first inner diameter, and
    the passageway connects with the first bore section.

14. The hub according to claim 12, wherein
    the passageway extends non-perpendicularly to the axial bore.

15. The hub according to claim 1, wherein
    the sealing element is an elastic ring.

16. The hub according to claim 1, further comprising
    an electrical component, and
    the cable being an electrical cable that is electrically coupled to the electrical component.

17. The hub according to claim 1, further comprising
    an electric power generator, and
    the cable being an electrical cable that is electrically coupled to the electric power generator.

18. A hub for a human-powered vehicle, the hub comprising:
    a hub axle having a center axis;
    a member provided to the hub axle; the member includes an end cap that is provided on one end of the hub axle;

a cable extending through a passageway, the end cap includes an opening as the passageway in which the cable extends through;
a sealing element configured to occupy a space between the passageway and the cable;
a first spacer; and
a second spacer, the sealing element being disposed between the first spacer and the second spacer with respect to the center axis of the hub axle, the sealing element abutting against the first spacer, the second spacer and the end cap.

\* \* \* \* \*